Patented Aug. 14, 1951

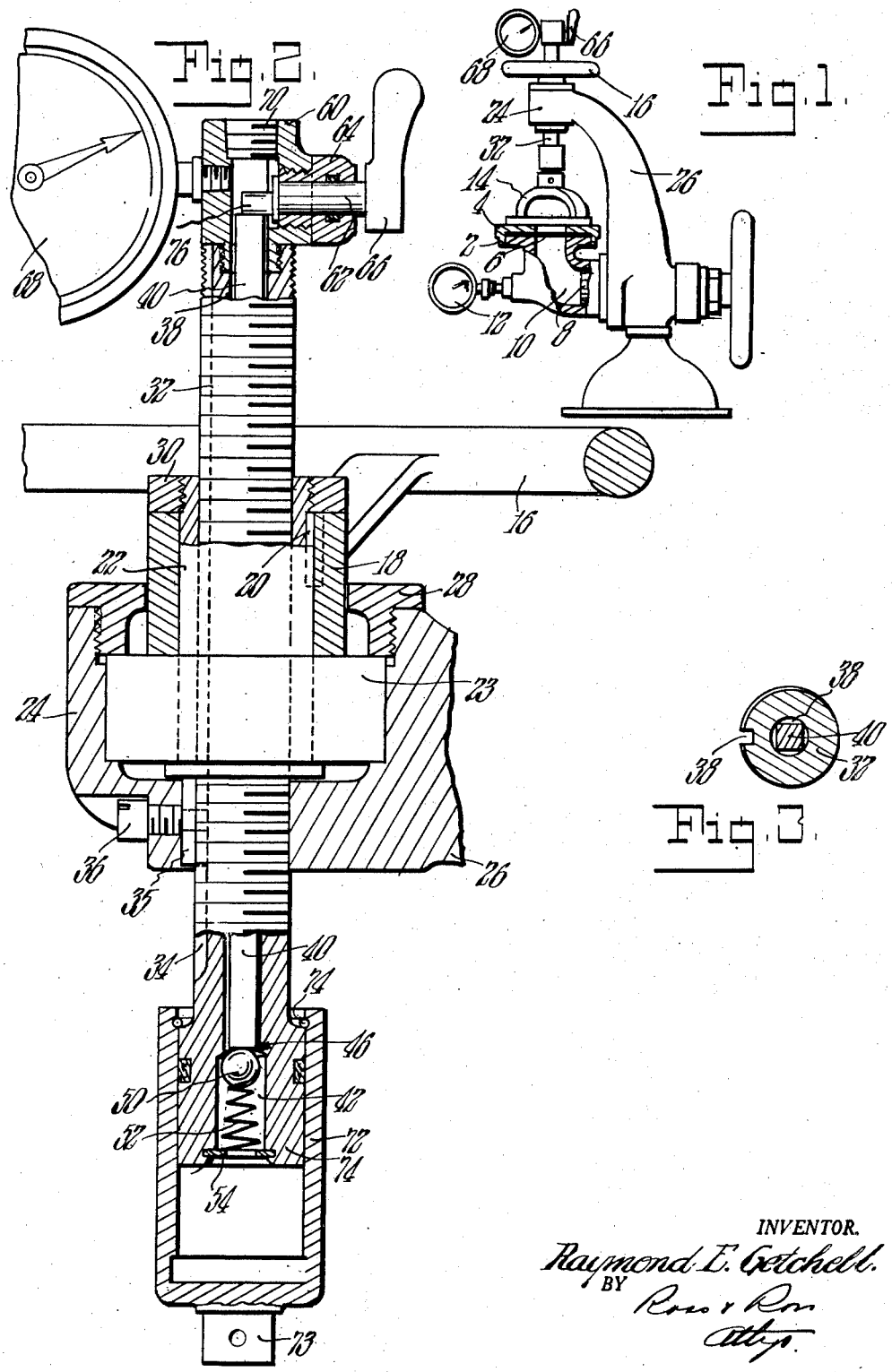

2,563,833

UNITED STATES PATENT OFFICE 2,563,833

MANUALLY OPERATED HYDRAULIC CLAMP-ING MEANS FOR TESTING MACHINES

Raymond E. Getchell, Holyoke, Mass., assignor to B. F. Perkins & Son, Inc., Holyoke, Mass., a corporation of Massachusetts Application January 24, 1949, Serial No. 72,294

5 Claims. (Cl. 73—102)

1

This invention relates to improvements in testing machines and is directed more particularly to improvements in machines whereby a specimen such as a sheet of paper is clamped to a platform and pressure is applied thereto by a yieldable diaphragm through an orifice.

The principal object of the invention is the provision of means for applying a predetermined clamping pressure to a specimen being tested in combination with means for releasing said pressure.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a small scale elevational view of a testing machine embodying the novel features of the invention;

Fig. 2 is a longitudinal sectional elevational view through the pressure applying means of the invention; and Fig. 3 is a sectional view through the spindle of the mechanism of Fig. 2.

Referring now to the drawings more in detail, the invention will be fully described.

A testing machine is shown in Fig. 1 which is similar to that shown in U. S. Patent 1,901,359 of March 14, 1933.

A platform 2 and a clamp ring 4 are apertured with a yieldable diaphragm 6 therebetween. A piston 8 is moved back and forth in a bore 10 by a hand wheel to force liquid against the diaphragm 6 so as to distend it for rupturing a specimen clamped to the platform 2.

A pressure gauge 12 indicates the pressure established in the bore. A clamp 14 clamps the specimen to the platform 2.

According to this invention a hand wheel 16 has a hub 18 keyed by 20 to a bushing 22 which is mounted for rotation by an anti-friction bearing 23 in the upper end 24 of the yoke 26 of the tester shown.

The bearing 23 is retained in member 24 by a cap 28 screw threaded in said member and a nut 30 holds the hub of the hand wheel on the bushing.

A stem 32 is externally screw threaded and in threaded engagement with the bushing 22. Said stem is provided with a longitudinal key-way 34.

2

A key 35 held in the member 24 by a screw 36 is seated in the key-way 34 to hold the stem against rotation.

The stem 32 is provided with a longitudinal bore 38 in which is a non-round valve operating rod 40. A valve chamber 42 in the lower end of the stem is provided with a seat 46.

A valve 50 is urged towards seat 46 by a spring 52 which bears on an apertured retainer 54 in the lower end of chamber 42. Member 40 may be moved downwardly to move valve 50 away from seat 46.

A cap member 60 is in screw threaded engagement with the upper end of stem 32 which has a bore, as shown. A shaft 62 is rotatable in a bushing 64 threadedly engaging member 60 and has an operating lever 66 on its outer end.

A pressure gauge 68 is connected to the cap, as shown, or it may be connected in an opening for a plug 70 which is shown in Fig. 2.

A cylinder 72 is reciprocable on the lower end of the threaded stem 32. A snap ring 74 is provided to limit downward movement of the cylinder on the stem and the lower end of the cylinder is provided with a stud 73 for connecting to clamp 14.

With the cylinder filled with air, liquid, or the like, a specimen is clamped to the platform by clamp 14 when stem 32 is moved downwardly by rotation of hand wheel 16.

Any pressure desired may be obtained which is desirable as various materials being tested either require or are physically unable to withstand certain pressures in the clamping operation for rupturing by operation of plunger 8.

It is possible to indicate the pressure prevailing by moving valve 50 downwardly by means of rod 40 so that the prevailing pressure is indicated by gauge 68.

This is accomplished by a cam member 76 on shaft 62 which has a surface for acting on the upper end of member 40 which is disposed eccentrically relative to the axis of rotation of said shaft 62, as in Fig. 2.

Thus it is possible to provide the desired clamping pressure of clamp 14 by operation of the coacting stem and cylinder.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination with the yoke above the specimen platform of a bursting testing machine of means for clamping a specimen to said platform comprising, a screw threaded elongated stem and connections between said stem and yoke whereby said stem is reciprocable towards and away from said platform and non-rotatable relative thereto, means for reciprocating said stem, and a cylinder reciprocable on the lower end of said stem having a clamp secured thereto for clamping a specimen to said platform, said stem provided with a longitudinal bore in communication with said cylinder, releasable valve means normally closing the lower end of said bore against pressure in the cylinder as the stem is moved downwardly for clamping a specimen to said platform by said clamp, a pressure gauge in communication with the upper end of said bore, and actuating means to release said valve means whereby pressure in said cylinder is communicated to said gauge through the bore of the stem.

2. The combination with the yoke above the specimen platform of a bursting testing machine of means for clamping a specimen to said platform comprising, a screw threaded elongated stem and connections between said stem and yoke whereby said stem is reciprocable towards and away from said platform and non-rotatable relative thereto, means for reciprocating said stem, and a cylinder reciprocable on the lower end of said stem having a clamp secured thereto for clamping specimen to said platform, said stem provided with a longitudinal bore in communication with said cylinder, releasable valve means normally closing the lower end of said bore against pressure in the cylinder as the stem is moved downwardly for clamping a specimen to said platform by said clamp, a pressure gauge in communication with the upper end of said bore, and actuating means to release said valve means whereby pressure in said cylinder is communicated to said gauge through the bore of the stem, said valve means including a seat provided in said stem around the lower end of said bore and a valve member spring pressed thereagainst.

3. The combination with the yoke above the specimen platform of a bursting testing machine of means for clamping a specimen to said platform comprising, a screw threaded elongated stem and connections between said stem and yoke whereby said stem is reciprocable towards and away from said platform and non-rotatable relative thereto, means for reciprocating said stem, and a cylinder reciprocable on the lower end of said stem having a clamp secured thereto for clamping a specimen to said platform, said stem provided with a longitudinal bore in communication with said cylinder, releasable valve means normally closing the lower end of said bore against pressure in the cylinder as the stem is moved downwardly for clamping a specimen to said platform by said clamp, a pressure gauge in communication with the upper end of said bore, and actuating means to release said valve means whereby pressure in said cylinder is communicated to said gauge through the bore of the stem, said valve means including a seat provided in said stem around the lower end of said bore and a valve member spring pressed thereagainst, said operating means including a rod disposed in the bore having a lower end engageable with said valve member and a movable member at the upper end of the stem for engaging the upper end of the rod and moving the rod downwardly against said valve member.

4. The combination with the yoke above the specimen platform of a bursting testing machine of a means for clamping a specimen to the platform comprising, an elongated stem, connections between said stem and the yoke making said stem reciprocable towards and away from the platform and non-rotatable relative thereto, means for reciprocating said stem, a cylinder reciprocable on the lower end of said stem having a clamp secured thereto for clamping a specimen to the platform, said stem provided with a longitudinal bore in communication with said cylinder, a valve normally closing the lower end of the bore against pressure in said cylinder as said stem is moved downwardly for clamping a specimen to the platform by the clamp, a pressure gauge in communication with the upper end of the bore, and actuating means to release said valve whereby pressure in said cylinder is communicated to said gauge through the bore of said stem.

5. The combination with the yoke above the specimen platform of a bursting testing machine of means for clamping a specimen to the platform comprising, an elongated stem and connections between said stem and yoke whereby said stem is reciprocable towards and away from the platform and non-rotatable relative thereto, means for reciprocating said stem, a cylinder reciprocable on the lower end of said stem having a clamp secured thereto for clamping a specimen to the platform, said stem provided with a longitudinal bore in communication with said cylinder, a valve normally closing the lower end of the bore against pressure in said cylinder as said stem is moved downwardly for clamping a specimen to the platform by the clamp, a pressure gauge in communication with the upper end of the bore, and an actuating means to release said valve whereby pressure in said cylinder is communicated to said gauge through the bore of said stem, said valve including a seat provided in said stem around the lower end of the bore and a valve member spring pressed thereagainst.

RAYMOND E. GETCHELL.

REFERENCES CITED

The following references are of record in the file of this patent:

UNITED STATES PATENTS

| Number | Name | Date |
|---|---|---|
| 1,019,721 | Munson | Mar. 5, 1912 |
| 1,599,964 | Haven | Sept. 14, 1926 |
| 1,605,311 | Webb | Nov. 2, 1926 |
| 2,078,296 | Vadner | Apr. 27, 1937 |
| 2,122,243 | Bonhard | June 28, 1938 |
| 2,332,818 | Smith | Oct. 26, 1943 |
| 2,340,733 | Clark | Feb. 1, 1944 |

FOREIGN PATENTS

| Number | Country | Date |
|---|---|---|
| 28,330 | Great Britain | A. D. 1906 |